June 22, 1926.

E. A. KUEN 1,589,759

LAMP CLOSURE FASTENING

Filed July 17, 1923

INVENTOR
Eugene A. Kuen
BY Thornton Bogert
ATTORNEY

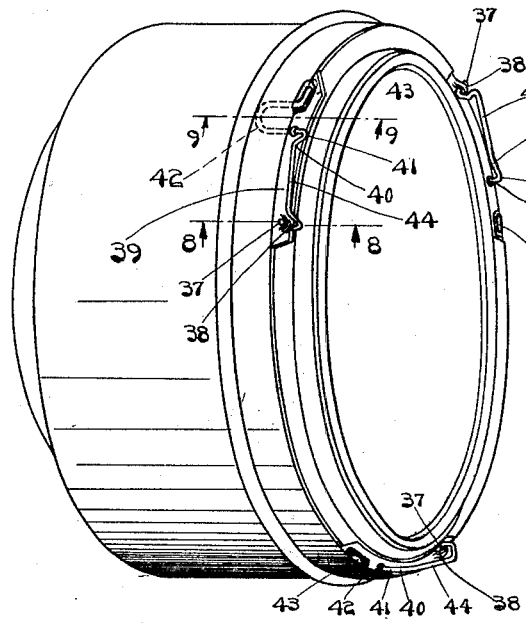
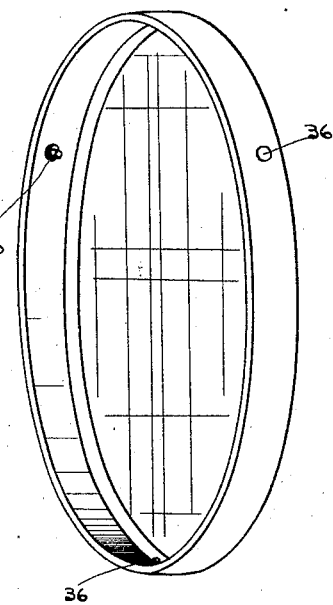
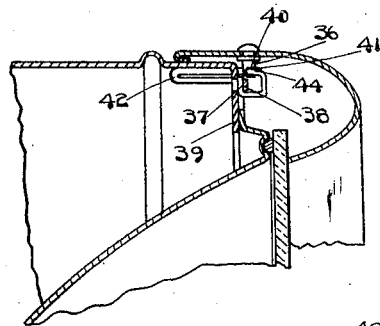
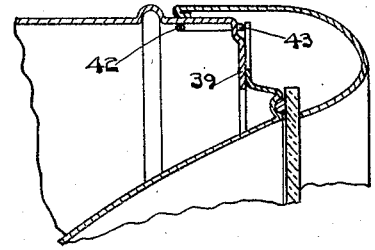
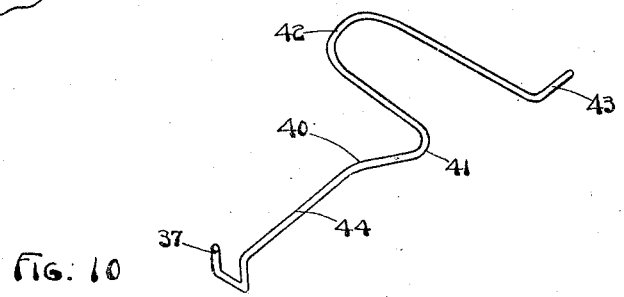

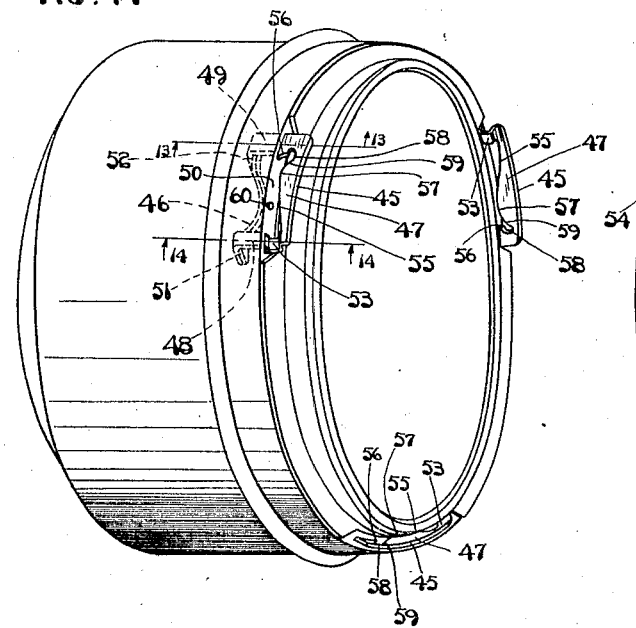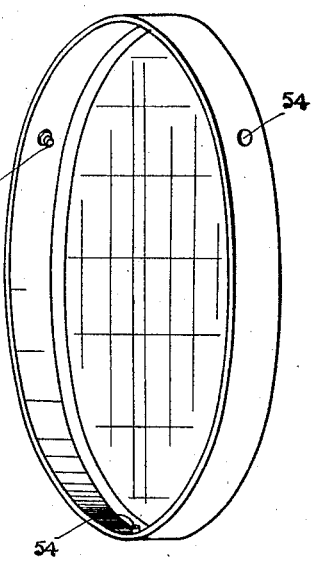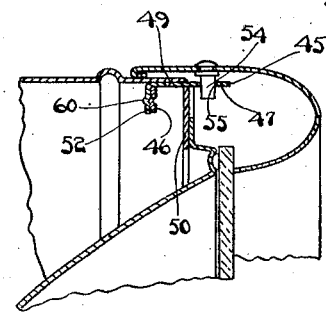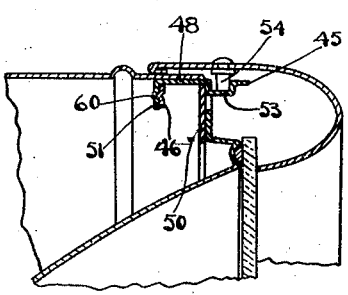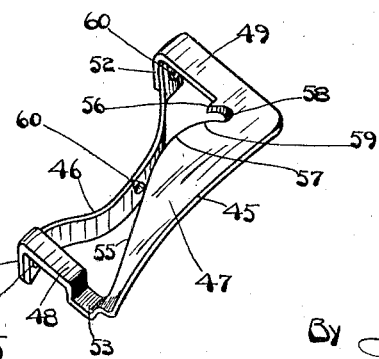

June 22, 1926.

E. A. KUEN 1,589,759

LAMP CLOSURE FASTENING

Filed July 17, 1923

INVENTOR
Eugene A. Kuen
By Thornton Rogert
ATTORNEY

Patented June 22, 1926.

1,589,759

UNITED STATES PATENT OFFICE.

EUGENE A. KUEN, OF CINCINNATI, OHIO, ASSIGNOR TO THE THOS. J. CORCORAN LAMP CO., OF CINCINNATI, OHIO, A CORPORATION OF OHIO.

LAMP CLOSURE FASTENING.

Application filed July 17, 1923. Serial No. 652,058.

This invention relates particularly to an improved closure fastening for automobile head lamps and has for an object to produce a closure fastening in which a simple and efficient fastening together of the body and lamp closure is accomplished without the use of any other agency than the hands.

A further object is to produce a lamp closure fastening which will require a minimum of time and labor in its manufacture and installation, and which may be made of stock material in which the simplest of cutting and forming operations are required.

These and other objects are attained in the fastening described in the following specification and illustrated in the acompanying drawings, in which:—

Fig. 6 is a perspective view of a lamp body having another form of fastening device embodying my invention, a reflector also being shown mounted in the body.

Fig. 7 is a perspective view of a closure adapted to cooperate with the body and fastening shown in Fig. 6.

Fig. 8 is a fragmental sectional view taken on the line 8—8 of Fig. 6, showing the closure in position.

Fig. 9 is a view similar to Fig. 8 but taken on the line 9—9 of Fig. 6, showing the closure in position.

Fig. 10 is a perspective view upon an enlarged scale, of the form of my invention as shown in Figs. 6, 8 and 9.

Fig. 11 is a view similar to Figs. 1 and 6, but showing a lamp body having another form of closure fastening embodying my invention.

Fig. 12 is a view illustrative of the closure employed with the form of construction shown in Fig. 11.

Fig. 13 is a view fragmentally in section, taken on the line 13—13 of Fig. 11, showing the closure in position.

Fig. 14 is a view similar to Fig. 13 but taken on the line 14—14 of Fig. 11, also showing the closure in entering position.

Fig. 15 is a perspective view of the fastening disclosed in Figs. 11, 13 and 14.

Figure 1:
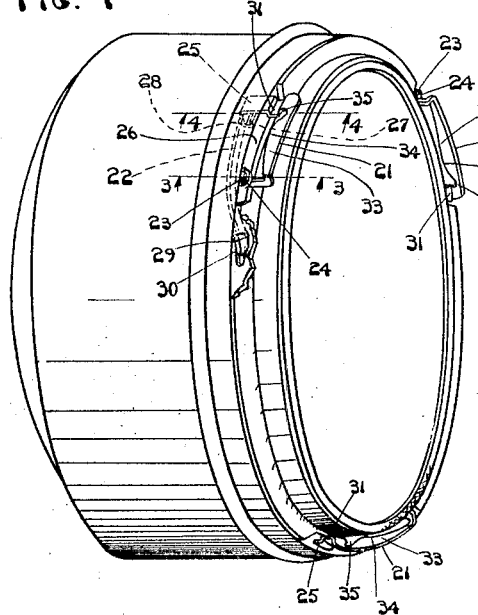
Fig. 1 is a perspective view of a lamp body having one form of fastening device embodying my invention, a reflector being shown mounted in the body in connection with my improved fastening device.
Figure 2:
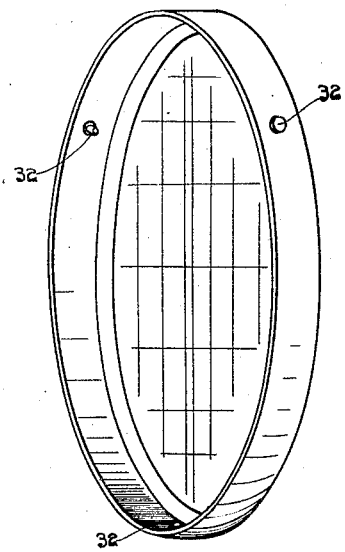
Fig. 2 is a perspective view of a lamp door or closure adapted for cooperation with the body and fastening shown in Fig. 1.
Figure 3:
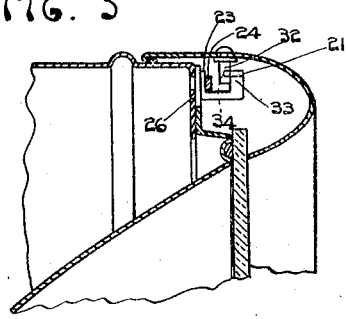
Fig. 3 is a fragmental sectional view taken on the line 3—3 of Fig. 1, showing the closure in position.
Figure 4:
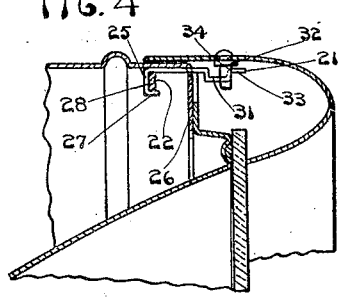
Fig. 4 is a view similar to Fig. 3, but taken on the line 4—4 of Fig. 1, with the closure in position.
Figure 5:
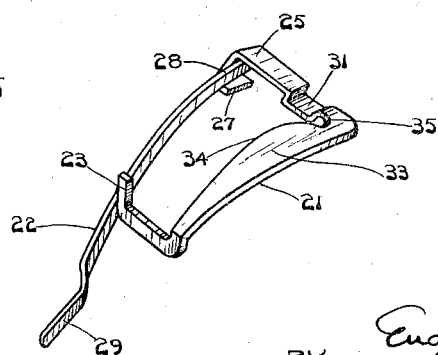
Fig. 5 is a perspective view upon an enlarged scale of the fastening device shown in Figs. 1, 3 and 4.
Figure 16:
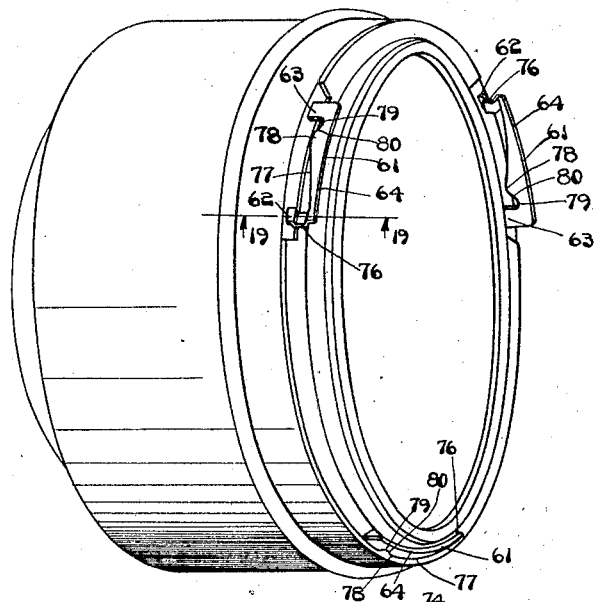
Fig. 16 is a perspective view disclosing an additional form of fastening embodying my invention applied to an automobile lamp body.
Figure 17:
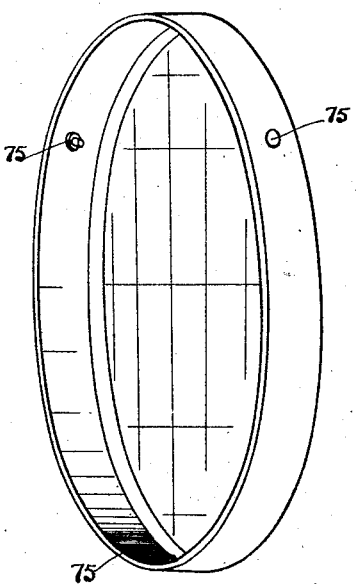
Fig. 17 is a closure of the construction shown in Fig. 16.
Figure 18:
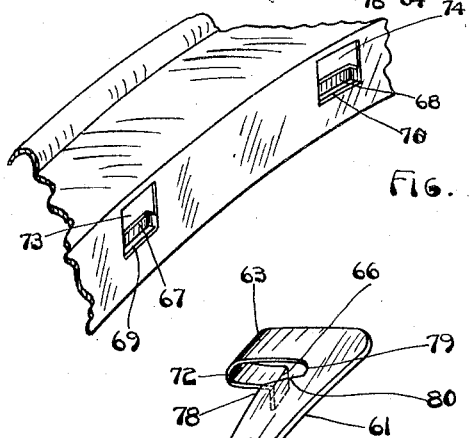
Fig. 18 is a fragmental perspective view upon an enlarged scale, of a portion of a lamp body prepared for the installation of the form of fastening shown in Fig. 16.

The form of my invention as I have shown it in Figs. 1 to 5 inclusive, consists of a keeper 21 and a spring 22 for actuating the keeper. The keeper is pivoted at one outturned end 23 in a suitable fastening such as a loop 24 which is struck from the metal of the body. The other end 25 of the keeper passes through and is located beneath the inturned body flange 26. This end terminates in a hook 27 which engages the free end 28 of spring 22. The opposite end 29 of spring 22 is secured in a suitable manner, as for example within a slotted pocket 30 formed in the body flange 26. Upon end 25 an offset 31 is formed, which serves to retain the keeper against too great an inward movement under pressure of end 28 of spring 22. Central section 33 of keeper 21 is provided with an elevation 34 which terminates in a depression or notch 35. This is for the passage of the cooperating closure element or pin 32 over elevation 34 and into depression 35 when the closure is being locked in position. I locate one or more of my improved fastening devices preferably in uniformly spaced relation about the periphery of the body and closure, as shown, so that the closure will be held with a uniform degree of pressure upon all sides.

In the locking or fastening operation it is but necessary to place the closure over the body with the pins 32 in position to be brought against the rear edges of the elevations 34 from the direction of ends 23. Forced rotation of the closure will then cause the pins 32 to ride over the rear edges of the elevations, lifting the keepers against the tension of springs 22, and, after having passed the ridge thereof, to be brought into the locking depressions or notches 35. Thus the closure will be held very securely against inadvertent disengagement from the body, such as might be occasioned by vibration in the operation of a vehicle carrying a lamp equipped with my invention. Upon forceable reverse rotation of the closure the pins 32 will ride over the elevation edges 34 and become disengaged therefrom, the springs acting to permit the keepers to yield in response to such a reverse rotation.

The form of my invention shown in Figs. 6 to 10 inclusive is different from the form just described, in that the keeper and spring are formed integrally. I have shown this form as being made of a flexible material from end to end of the keeper, as for example round or flat wire because of the incorporation of the spring as an integral part of the keeper in the particular shape I have illustrated. The closure is the same as that employed in the construction I have previously described and contains the closure fastening pins 36 which cooperate with the keeper. Where the pin enters the keeper the end 37 is offset and bent for securing to the body, as for example beneath a loop 38 which is struck from the body flange 39, for the purpose of securing or pivoting the end at this point. From this point to a bend 40 the keeper is bent to approach the lamp body flange 39 at the point where bend 40 occurs. From bend 40 the keeper is bent inclined away from the body to form a leg between which and bend 40 a notch 41 is formed for the engagement of the cooperating one of the pins 36. This latter extension or leg of the keeper passes beneath the body flange and is made into a spring loop 42 which terminates in a substantially right angled end 43 secured to the body flange somewhat as shown, in which a loop is provided to retain the end against displacement when the keeper is under tension.

In the fastening operation the closure is placed over the body with the pins 36 in position in front of the ends 37 of the keepers. By then rotating the closure, the pins are brought into engagement with portions 44 of the keepers, which because of the incline from the ends 37 thereof to the bends 40, at which point the keepers preferably contact the body flange, cause flexure of the keepers. When bends 40 are reached, the pins pass into notches 41. At this point the closure becomes positively locked upon the body against a continued rotation in the locking direction, by the pins having been brought to engage the leg of loop 42 adjacent to notch 41. However the closure locking function of the keepers is also performed should a normal tendency to reverse the rotation of the closure take place, but this locking against reverse rotation is not a positive action inasmuch as a forced reverse rotation will cause the pins to ride over the relatively short incline from notch 41 to bend 40, thereby flexing the keepers to allow of continued reverse rotation over portions 44 and complete removal of the closure from the body when the pins have passed beyond the open ends 37.

The disclosure of my invention as embodied in Figs. 11 to 15 inclusive, is that of a keeper 45 which is controlled by a spring 46 as to both of its ends instead of one end as in the two constructions I have already described. The keeper 45 consists of a central portion 47 having at its ends legs 48 and 49 which pass through the body flange 50. Both legs have inturned feet 51 and 52 upon which the ends of the semi-elliptic spring 46 rest, the center of the spring bearing upon the underside of the body flange. Between leg 48 and central portion 47 of the keeper I have provided an offset 53 which performs the function of holding this end of the keeper against entering the body flange too far, as well as affording passage for the cooperating one of the pins 54 into operative engagement with the inclined under face 55 of the central portion 47 of the keeper. Between leg 49 and central portion 47 I have provided a lug 56 which prevents too great an entrance of the keeper at this end into the body flange. Inclined face 55 of the keeper terminates in an elevation 57 which leads to a notch 58 over a short and relatively steep inclined face 59. Inasmuch as both ends of the keeper are retained in position by pressure of spring 46 it is essential that displacement of the spring be prevented. To accomplish this I provide center punch indentations 60 or other means to prevent such inadvertent displacement.

The operation of locking the closure upon the body is performed by bringing the pins 54 into position to enter offsets 53 and then rotating the closure to bring them into contact with inclined faces 55. Continued rotation will cause the pins to lift the keeper against pressure of spring 46 until elevation 57 is passed. The pins then passing over face 59 will engage notch 58 and be locked against continued movement in locking direction. Attempted reverse rotation of the closure will find the pins locked against all but a forced reverse rotation sufficient to overcome the resistance afforded by the steep incline 59 in cooperation with spring 46. Thus the closure may be removed when desired, but be prevented from becoming disengaged inadvertently.

Figure 19:
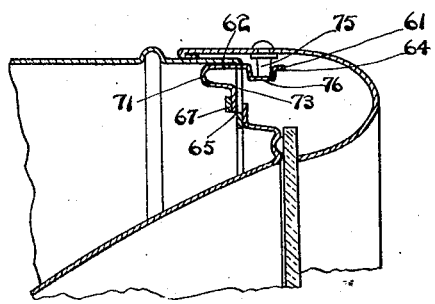
Fig. 19 is a fragmental sectional view upon an enlarged scale, taken on the line 19—19 of Fig. 16 and showing the closure fastening element in entering position.
Figure 20:
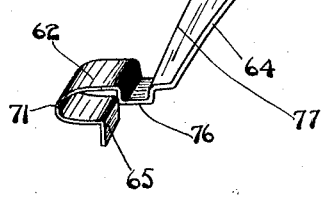
Fig. 20 is an enlarged perspective view of the form of my invention shown in Fig. 16.

In Figs. 16 to 20 inclusive an embodiment resembling that disclosed in Figs. 11 to 15 inclusive is shown. The distinction lies however in the elimination of a spring element and in the embodiment in the keeper 61 of a spring construction by making the keeper of spring sheet metal. Legs 62 and 63 are formed at the ends of the central portion 64 and are secured to the body flange by turned in ends 65 and 66 which lie over loops 67 and 68 respectively and pass under the body flange through slots 69 and 70, looped spring portions 71 and 72 passing through slots 73 and 74 as shown in Fig. 19. To afford passage of the closure pins 75 I have provided an offset 76 so that the rotation of the closure will bring the pin to engage an inclined under face 77 of central portion 64. This inclined face terminates in an elevation 78 which leads the pin to a notch 79 over an incline 80. The central portion 64 is of yielding construction, as well as the legs, being made of the same piece of material.

In mounting the closure in locked position on the body, the pins 75 are brought into off-sets 76 of the springs, and the closure is rotated to bring them into engagement with surface 77. Forcing a continued rotation of the closure will now cause legs 62 and 63 as well as central portion 64 to yield, until elevation 78 is reached. The pins will then pass into the notches 79 upon resumption of the keepers to normal condition, the pins 75 during this operation passing down the steeply inclined faces 80. Inadvertent reverse rotation of the closure will be prevented by the locking action of the pins against the face 80, but when the reverse rotation is forced so that the pins are caused to flex the central portion 64 and leg 63 by riding over inclined face 80, the closure pins will pass over elevation 78 and after leaving surface 77 permit the closure to be removed.

In the operation of my improved closure fastening the functions performed are several. The principal function is that of fastening the closure and body together. Another is that of securing the closure glass as well as the reflector against displacement and to prevent rattle with the accompanying noise and damage resulting therefrom. In addition to this I have provided a construction in which a minimum of manufacturing operations is required, both to produce the parts of the fastener and to prepare the lamp elements for their reception, as well as to assemble them therewith, thus resulting also in a material saving in cost of production.

Having thus described my invention what I claim is:

1. A lamp closure fastener comprising a keeper mounted on the body of a lamp and having an inclined pin engaging surface terminating in a pin retaining notch, legs extending from the ends of the keeper and supporting it in front of the body, one of said legs pivoting the keeper at one end, the other of said legs being movably mounted for reciprocation within the body, a spring secured to the body at one end and yieldingly engaging the movably mounted leg of the keeper, and a pin on the closure adapted for engagement with the keeper.

2. A lamp closure fastener comprising a keeper mounted on the body of a lamp and having an inclined pin engaging surface terminating in a pin retaining notch, legs extending from the ends of the keeper and supporting it in front of the body, one of said legs pivoting the keeper at one end, the other of said legs being yielding to resist pivoting movement of the keeper, and a pin on the closure for cooperation with the keeper.

3. A closure fastener for the body and closure of automobile lamps, comprising a keeper, a keeper spring, and a pin cooperating therewith, said keeper consisting of a central portion and a leg extending from one end of the central portion, said keeper leg being pivoted on the lamp body, a leg extending from the other end of the central portion and into the lamp body for reciprocation therein when the keeper is moved on said pivoted leg, a spring attached at one end to the lamp body and bearing at its opposite end upon the second mentioned keeper leg to pull said leg into the body, the central portion of said keeper having an inclined pin engaging surface adjacent to the pivoted leg and terminating in a notch adjacent to the second mentioned leg, said pin being secured to the closure and cooperating with the keeper for passage over the inclined surface and entrance into the notch when the closure is rotated.

EUGENE A. KUEN.